Sept. 27, 1932.  A. W. KRIEG  1,879,816
MANUFACTURE OF CANDLE HOLDERS
Filed April 1, 1930
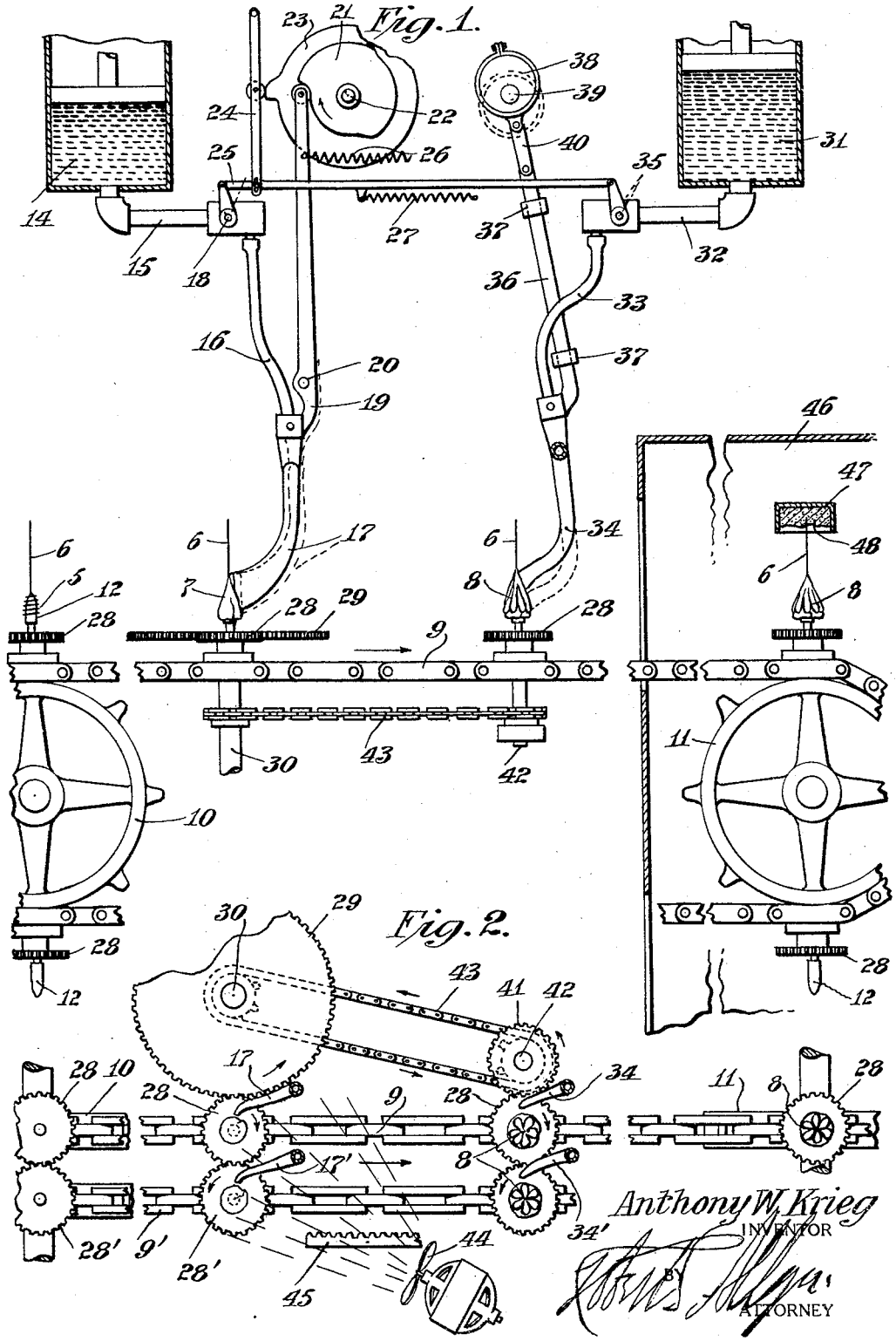
Anthony W. Krieg
INVENTOR
ATTORNEY Patented Sept. 27, 1932

1,879,816

UNITED STATES PATENT OFFICE

ANTHONY W. KRIEG, OF BROOKLYN, NEW YORK, ASSIGNOR, BY DIRECT AND MESNE ASSIGNMENTS, OF ONE-HALF TO CYPRESS NOVELTY CORPORATION, OF BROOKLYN, NEW YORK, A CORPORATION OF NEW YORK, AND ONE-HALF TO N. D. Q. SPECIALTY CORPORATION, A CORPORATION OF NEW YORK

MANUFACTURE OF CANDLE HOLDERS

Application filed April 1, 1930. Serial No. 440,752.

My invention relates to the manufacture of what are commonly termed ornamental birthday cake candle holders and the like, consisting of a socket surrounded by an ornamental body formed of so-called icing.

One object of my invention is to provide a method and apparatus for manufacturing such devices economically and at high speed.

Another object is to provide for the manufacture of more attractive holders.

According to my invention the holders consist of three parts made in separate steps—first, the socket member, which preferably consists of a helix of wire having a stem; second, the body member applied to the socket portion; and third, an external ornamental sheath. The socket member is preferably formed on a suitable automatic machine, as is customary. The body is formed by depositing a suitable plastic composition on the socket and the ornamental sheath is formed by a separate step by depositing other plastic material on the outside of the body. The sockets are mounted on a suitable conveyor by which they are successively presented to the depositing devices for the application of the plastic material. After the body is applied to the socket it is dried somewhat as it passes on to the means for applying the ornamental external sheath.

The entire holder is then dried and packed. In case they are not entirely dried before leaving the machine they are picked up and allowed to stand in a suitable carrier. The machine is preferably so organized as to produce a number of holders at the same time and a number of the completed holders may be simultaneously removed by the use of the pick-up or carrier.

Fig. 1 is a front view somewhat diagrammatic showing mechanism embodying my invention and for carrying out my process.

Fig. 2 is a fragmentary plan view and partial section of the same.

The holder itself in the form shown consists of a helical socket 5 having a stem 6. The body 7 is applied directly to the socket portion and the ornamental sheath 8 is subsequently applied to the body 7 preferably in the form of ornamental scallops so as to simulate a rose.

The conveyor 9 may be in the form of a chain traveling on the sprockets 10 and 11 and driven in any suitable manner. The conveyor carries a number of spindles 12 on which the sockets 5 are mounted.

The plastic material such as a stiff paste of sugar or icing is contained within a suitable compression reservoir 14 from which it is forced through pipes 15 and 16 and squirted through the nozzle 17 on to the socket 5. A valve 18 is provided in the conduit for controlling the feed of the composition. The nozzle portion 17 is preferably carried by an arm which is pivoted at 20 and oscillated by the cam 21 on the shaft 22. Another cam 23 on the same shaft controls the lever 24 which is connected by link 25 to the valve 18. Springs 26 and 27 hold the levers 19 and 24 under tension in contact with the respective cams.

The spindles 12 are rotatably mounted on gears 28 which are rotatably carried by the chain 9. A larger gear 29 mounted on the shaft 30 is organized to engage the gears 28 when they are in the position shown in the drawing with a gear 28 meshing with gear 29.

Preferably there are a number of conveyors such as 9 and 9' provided with gears 28 and 28' meshing with each other and organized to operate in unison. And there are a number of squirting nozzles such as 17 and 17' so that a number of holders may be formed simultaneously.

Another pressure reservoir 31 contains plastic material and is connected by conduits 32 and 33 to nozzles 34 and 34'.

This nozzle is mounted to move up and down so that its outlet travels parallel to an element of the conical body 7 so as to produce loop-like deposits 8. A valve 35 controls the passage of the composition through the conduit to the nozzle 34 and is connected to the lever 24 above mentioned. The nozzle 34 is preferably supported by a slide 36 which moves up and down on stationary guides 37. This reciprocation is produced by cam or eccentric 38 on the shaft 39 and the link 40.

The gear 41 is spaced apart from the gear 29 and meshes with one of the gears 28. This gear 41 is mounted on the shaft 42 and driven by chain 43 from shaft 30.

In the form shown the gear ratio of the driving mechanism is such that the gear 29 rotates the spindle adjacent the nozzle 17 three times, while the gear 41 rotates the adjacent spindle only once. The result is that three layers of composition are applied to the socket 5 while a single layer is applied by the nozzle 34. The shaft 39 and connections to the nozzle 34 are such as to give a number of reciprocations to the nozzle 34 while the spindle adjacent thereto rotates once, the result being that a number of loops or petal-like deposits are made, preferably six.

As the bodies 7 are moved from the nozzles 17 and 17' to the nozzles 34—34', the composition has time to dry somewhat. This may be accelerated by any suitable means, as for instance the fan 44. If desired, a rack 45 may be mounted alongside the gears 28' so as to rotate the bodies 7 as they pass along.

After the holders are completed they may be passed through a drier 46 to hasten the hardening action. On account of the considerable length of time required to completely set the composition it will probably by desirable in most cases to remove the holders from the conveyor before they are completely dried. For this purpose the pick-up device 47 may be employed. This is in the form of a channel containing a putty-like composition 48 adapted to be applied to the stems of a row of the completed holders so as to simultaneously pick up all the holders in one row. The holders will then be stacked on a tray (not shown) and put away to complete the drying action.

According to this system, it will be seen that the holders may be made rapidly. This also makes it possible to produce different designs on the same machine by utilizing the same conveyor and the same depositing nozzle 17 and varying the length of stroke of the petal-forming nozzle 34 or the number of strokes.

It is also possible by this process to use a different kind of composition with a different color or a different flavor in the body to that in the petals or outer sheath. Many different combinations of color and/or flavor may thus be produced by simply using the proper composition. In case the holders are not required to be edible it is possible to use other compositions besides sugar or to mix other materials with the sugar. Although I have shown a machine as organized to produce three layers of the body for each layer of the sheath, it should be understood that in some cases the body may be formed of one or more layers.

It will be understood of course that the cam 21 will be designed to move the nozzle 17 step by step away from the revolving socket at a rate depending upon the thickness of the deposited ribbon and the rate of rotation of the spindle.

It should also be understood that although I have shown mechanism for applying two layers to the socket, a third set of nozzles might be employed for adding another layer, if desired.

By dividing the work of applying the plastic composition into steps performed by separate nozzles it is possible to materially increase the speed of production.

The sockets 5 will ordinarily be placed on the spindles 12 by hand and the finished candle holders may be removed by hand but it is preferred to bring pick-up trays such as 47 down onto the upper ends of the holder stems and take them away automatically on a conveyor.

I claim:

1. The method of making an ornamental candle holder which comprises covering a wire form with plastic material to form the body, permitting the body to partially dry and then applying a series of petal simulations to the outside of the body.

2. The method of making an ornamental candle holder which comprises rotating a form while squirting a ribbon of plastic material down on to the form to make a body, moving the body to another position and squirting a series of petals on to the body.

3. A machine for making an ornamental candle holder which comprises means for rotating a form, means for squirting a ribbon of plastic material on to the rotating form to make a body, means for moving the body to another position and other means for squirting a series of petals on to the body.

4. A candle holder machine comprising a conveyor, a spindle rotatably carried thereby, two separate means for successively rotating, the spindle at different speeds and two nozzles for successively applying plastic material to a socket on said spindle.

5. A candle holder machine comprising a conveyor, rotatable means carried by the conveyor for supporting wire sockets, and means for squirting a ribbon of plastic material on the sockets as they rotate to form bodies, means for moving the conveyor and bodies and means separate from the first means for then squirting petals on to the bodies after moving them.

6. A candle holder machine comprising a conveyor chain, a series of rotatable gears and spindles carried thereby and a stationary rack mounted alongside of the gears for rotating the gears as the conveyor moves.

7. A candle holder machine comprising a conveyor having a rotatable spindle, means for squirting plastic material on a socket on the spindle to form a body a fan for blowing air on to the body, means for feeding the conveyor and means for then applying an outer ornamental sheath to the body.

8. A candle holder machine comprising a number of conveyor chains arranged side by side, gears rotatably carried by each chain, the gears on one chain meshing with the gears on the other chain, means carried by each gear for supporting a socket, two driving gears adapted to successively engage the gears on one chain and means adjacent the two driving gears for squirting plastic material on the sockets.

9. A candle holder machine comprising a conveyor, a rotatable spindle for holding a socket carried thereby, a nozzle movable to a point adjacent the spindle, means for moving the nozzle step by step away from the spindle and squirting a ribbon on to the socket as the spindle rotates to form a body, a second nozzle spaced apart from the first nozzle, means for reciprocating said second nozzle in a direction parallel to an element of the surface of the body to form petals on the body as it rotates.

10. A candle holder machine comprising a row of spindles, means for applying plastic material to sockets on said spindles having wire stems and means for simultaneous engaging the stems to remove the finished holders.

11. An attachment for a candle holder machine comprising a narrow pick-up trough containing soft putty.

12. A machine for forming ornamental candle holders comprising means for applying plastic material to a wire form, and separate means for subsequently applying a layer of ornamental scallops to the plastic material.

13. A machine for making ornamental candle holders, comprising a series of movable spindles for holding sockets having projecting stems, means for applying a plastic composition to the sockets, and independently operable means for applying scallops to the plastic composition in successive steps.

ANTHONY W. KRIEG.